(12) United States Patent
Atkinson et al.

(10) Patent No.: US 6,321,811 B1
(45) Date of Patent: Nov. 27, 2001

(54) CD LABELER FIXTURE CROSS-REFERENCE TO RELATED APPLICATIONS

(75) Inventors: Peter Atkinson, Branford; Patricia A. Cecchi, Madison, both of CT (US)

(73) Assignee: Fellowes, Inc., Itasca, IL (US)

( * ) Notice: Subject to any disclaimer, the term of this patent is extended or adjusted under 35 U.S.C. 154(b) by 0 days.

(21) Appl. No.: 09/564,993

(22) Filed: May 4, 2000

Related U.S. Application Data

(63) Continuation-in-part of application No. 09/474,684, filed on Dec. 29, 1999.

(51) Int. Cl.[7] .............................. B32B 31/00; B65D 85/57
(52) U.S. Cl. ........................ 156/391; 156/556; 206/307; 206/308.1
(58) Field of Search .................................. 156/391, 556, 156/574, 580; D14/422, 442, 478; D6/626, 627; 206/307, 308.1

(56) References Cited

U.S. PATENT DOCUMENTS

D. 419,152 * 1/2000 Lowenstein .................... D14/121
5,511,659 * 4/1996 Bosworth .......................... 206/308.1
5,951,819 * 9/1999 Hummell et al. ...................... 156/556

FOREIGN PATENT DOCUMENTS

2763913-A1 * 12/1998 (FR) .

* cited by examiner

Primary Examiner—Richard Crispino
Assistant Examiner—Sue A. Purvis
(74) Attorney, Agent, or Firm—Allen D. Brufsky

(57) ABSTRACT

In accordance with the invention, a fixture is provided to receive a label to be applied to a CD disc. The fixture includes a base having a well of a dimension approximately the shape of the label and CD disc. The label, after printing indicia thereon, is placed adhesive side up in the well of the fixture. Since the well also approximates the shape of the CD disc, the disc may be placed in the well first, within the bounds of the well of the fixture, with its unwritten side facing up. The disc or label is then overlaid on the other manually in the well, and pressed in place, to adhere the label to the disc. A pair of oppositely disposed cutouts are provided in the fixture to enable the composite card and adhered label to be removed from the fixture by inserting the fingers beneath the laminate and lifting it up from the fixture. The sidewalls of the well are rotatable and opposed edges are straight and arcuate so as to present when oriented to the interior of the well, circular or truncated shape to the interior of the well to accommodate different shaped discs.

7 Claims, 6 Drawing Sheets

CD LABELER FIXTURE CROSS-REFERENCE TO RELATED APPLICATIONS

CROSS-REFERENCE TO RELATED APPLICATIONS

This application is a continuation-in-part application of Ser. No. 09/474,684, filed Dec. 29, 1999, assigned to the same assignee as the present invention.

BACKGROUND OF THE INVENTION

1. Field of the Invention

This invention relates to a device useful for applying a label to a truncated CD-ROM disc or the like, or a full circular disc.

2. Description of the Prior Art

Many devices exist for applying a label to a CD or DVD disc or the like. The disc is relatively large in diameter to the label, which is adhered to the center of the disc, and must therefore be guided into place on the disc to assure that it is properly located and adhered. Usually, the label is first printed with indicia on a computer-associated printer, and software is provided to enable various designs and identifying formats to be imprinted on the label prior to adhesion to the disc. The printed label is then laid on a support or base with its adhesive side up and the disc is placed on a moveable post element such as a spindle and brought into contact with the label. The spindle or post is placed through the center of the disc and is also received through the center of the label to locate the centers of the label and disc relative to each other so that the label is adhered to the middle of the disc. Examples of such labeler devices are found in U.S. Pat. Nos. 5,543,001 and 5,902,446 to Cassilo et al, U.S. Pat. Nos. 5,783,033 and 5,925,200 to Grossman, and U.S. Pat. No. 5,951,819 to Hummell.

However, if the label was to cover the entire unwritten side of the disc, such a precision locating device utilizing a moveable locating spindle is unnecessary. For example, recently information concerning an individual and his/her business has been written on a CD-disc utilizing a CD-writer, and provided as a substitute for a conventional business card. The disc can retain substantially more information than a conventional card and can be read on a standard computer. The disc is truncated and oval-shaped and smaller than a standard circular CD-ROM disc to simulate a standard rectangular business card and is inscribed on one side with relevant information. A label bearing some information as to whom the card-disc belongs is adhered to the entire unwritten face of the disc.

For similar purposes, discs are now also provided which are circular in play, but smaller than a conventional CD-ROM disc and are known as MiniCDs. This invention relates to a fixture enabling the label to be applied to the entire, unwritten face of the truncated disc, which can also be converted for use with the circular disc. In either case, the fixture can be used as a shipping and/or packaging tray for the disc.

SUMMARY OF THE INVENTION

In U.S. Ser. No. 09/474,684 a fixture is provided to receive a label to be applied to the truncated disc. The fixture includes an oval-shaped base having an oval-shaped well of a dimension approximately the shape of the label. The label, after printing indicia thereon, is placed adhesive side up in the well of the fixture. Since the well also approximates the shape of the CD disc, the disc may be placed in the well first, within the bounds of the well of the fixture, with its unwritten side facing up. The disc or label is then overlaid on the other manually in the well, and pressed in place, to adhere the label to the disc.

A pair of oppositely disposed cutouts are provided in the fixture to enable the composite disc and adhered label to be removed from the fixture by inserting the fingers beneath the laminate and lifting it up from the fixture.

Alternatively, a central aperture or a stationary post may be provided in the well of the fixture. The aperture can be used to aid removal of the laminated construction by inserting a finger beneath the fixture through the aperture to dislodge the laminate. A central post, on the other hand, will serve to space the label from the CD disc as one moves toward the other to preclude premature contact between the two, which may result in uneven adhesion or preclude coverage of the disc by the label because of first contact with the label not in proximity to its edge. The cutouts would be sufficient to enable removal of the composite from the fixture.

In accordance with this invention, the side walls surrounding the well may be removed and rotated to accommodate a different-shaped CD-ROM disc, which will fit precisely in the well. The side wall, includes an arcuate edge and a straight edge so that when positioned and adhered by an adhesive, (which permits alternate use for either shape), the edges form a continuation of the well in a shape to accommodate and match the outer perimeter of the disc, and label to be adhered to the disc, which is pressed to the unwritten face of the disc. The disc can also be shipped or packaged in the well.

The fixture 10 includes a body 12 formed from plastic or metal, provided with an oval-shaped well 14 sized to approximate the shape of an oval-shaped CD-ROM disc 13 or circular miniCD disc 15 imprinted with relevant business information normally found on a business card and more about the individual's company and a label L to be printed by a computer and adhered to the disc.

Located at opposite sides of the fixture are trapezoidal-shaped cutouts 16, 18, each provided with a circular end wall 20 to permit grip of the CDs with cutouts or to lift the labeler CDs from beneath the fixture to remove the same. A centrally located 22 can be provided in well 14 for use as described hereinafter.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
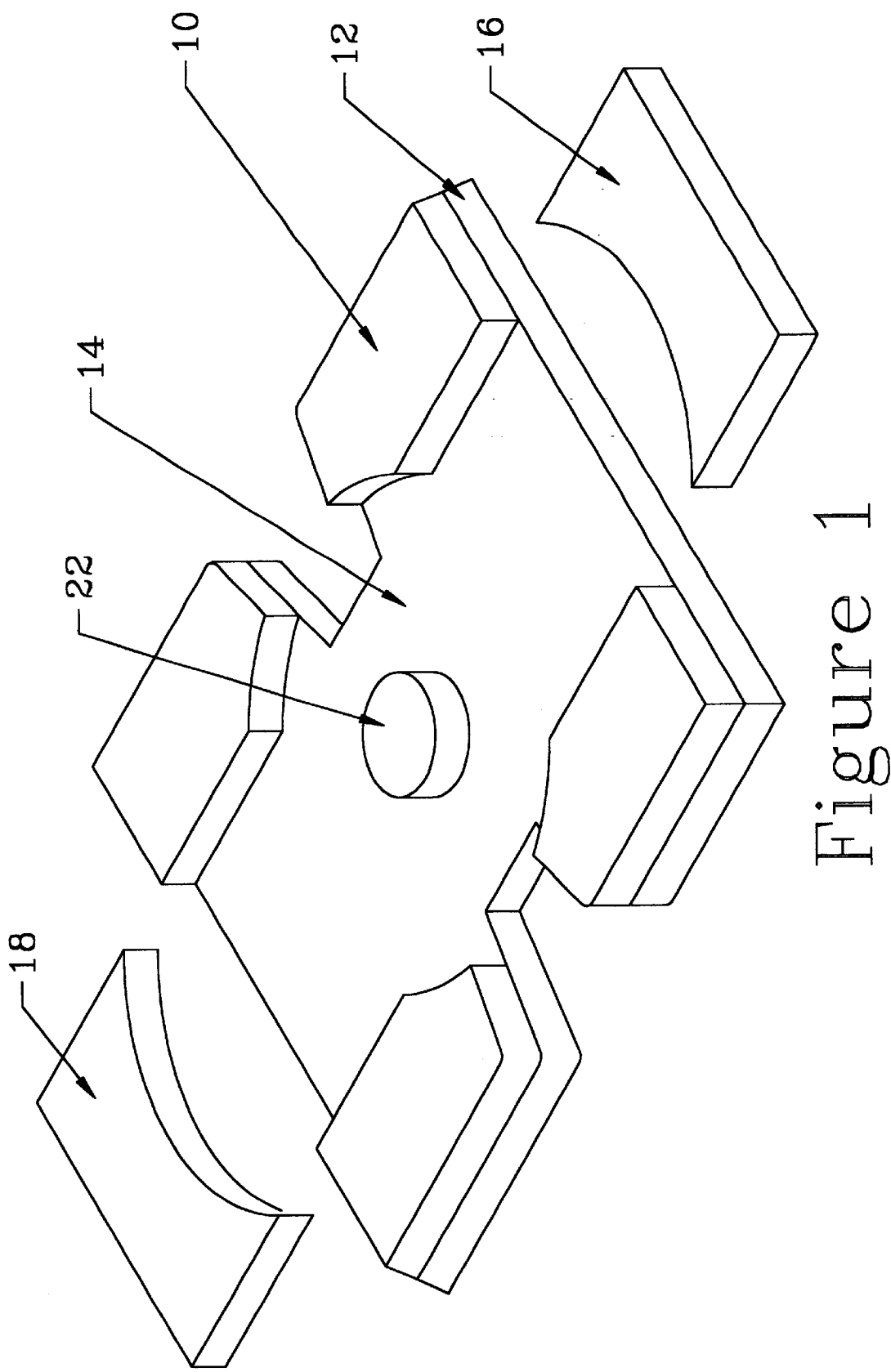
FIG. 1 is a perspective view of the CD labeler fixture of the present invention.
Figure 2:
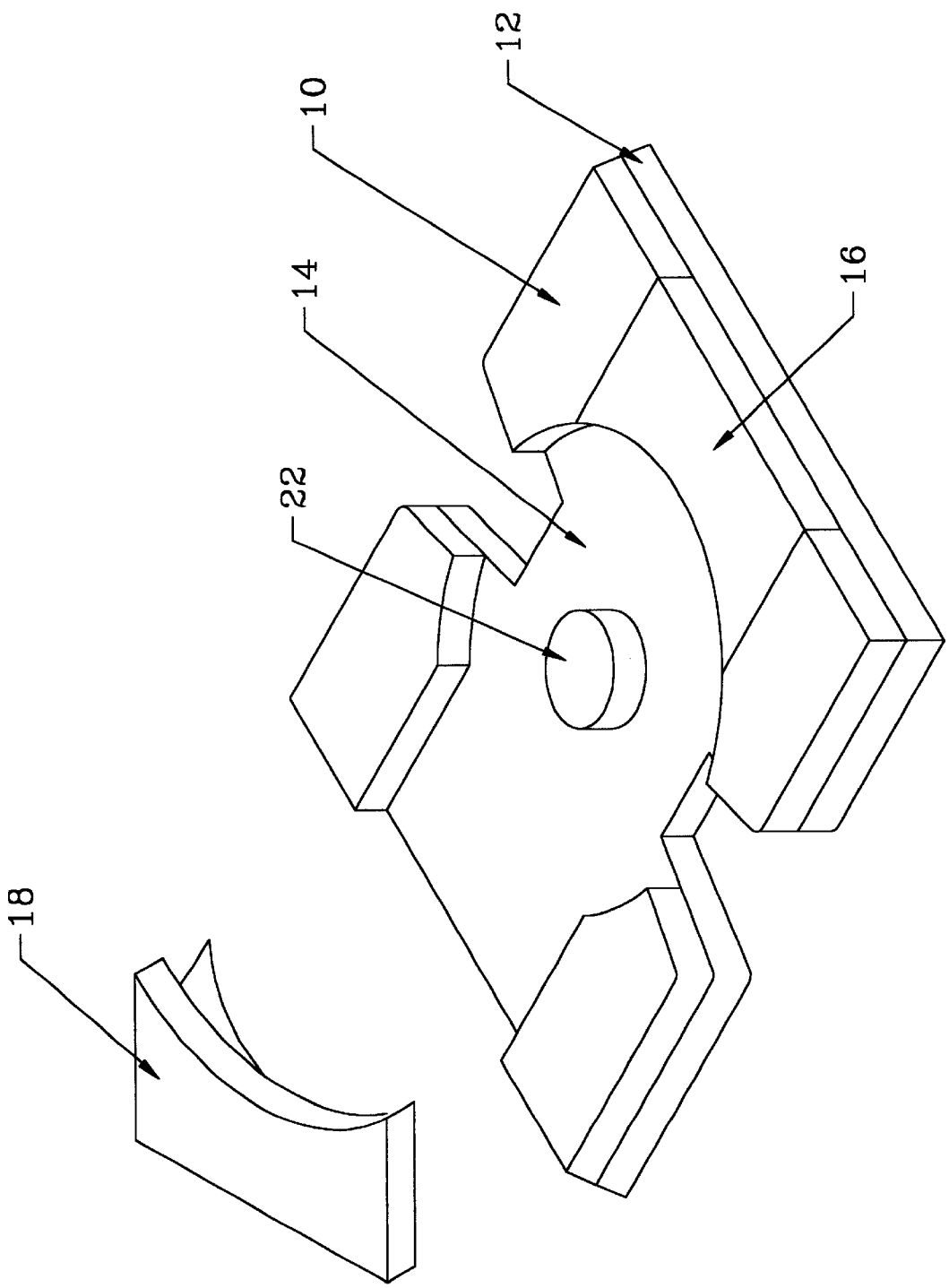
FIG. 2 is a view of the fixture of FIG. 1 illustrating the placement of a label therein.
Figure 3:
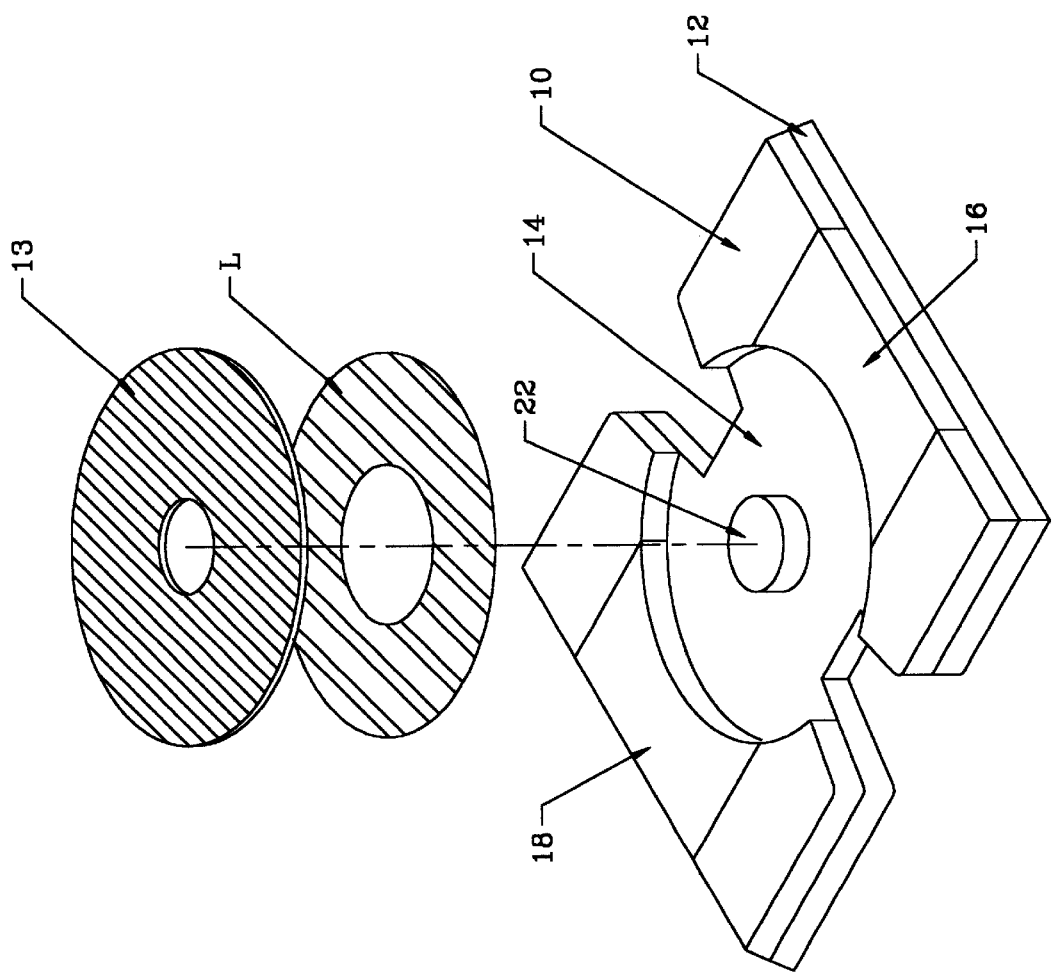
FIG. 3 is a view of the fixture of FIG. 2 illustrating the placement of a truncated CD-ROM disc on the label.
Figure 4:
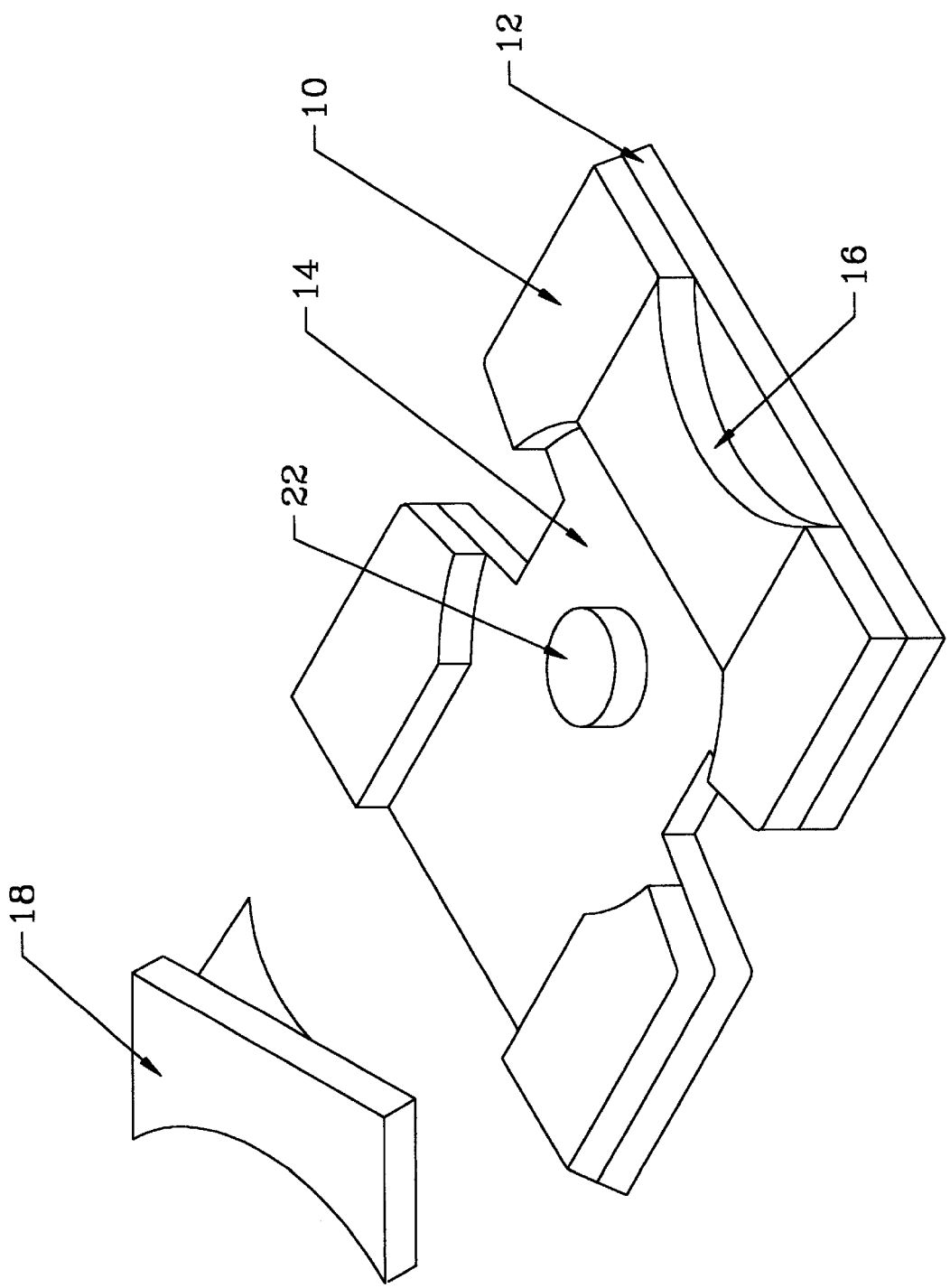
FIG. 4 is a view of the fixture of FIG. 3 illustrating the manner of adhering the disc to the label.
Figure 5:
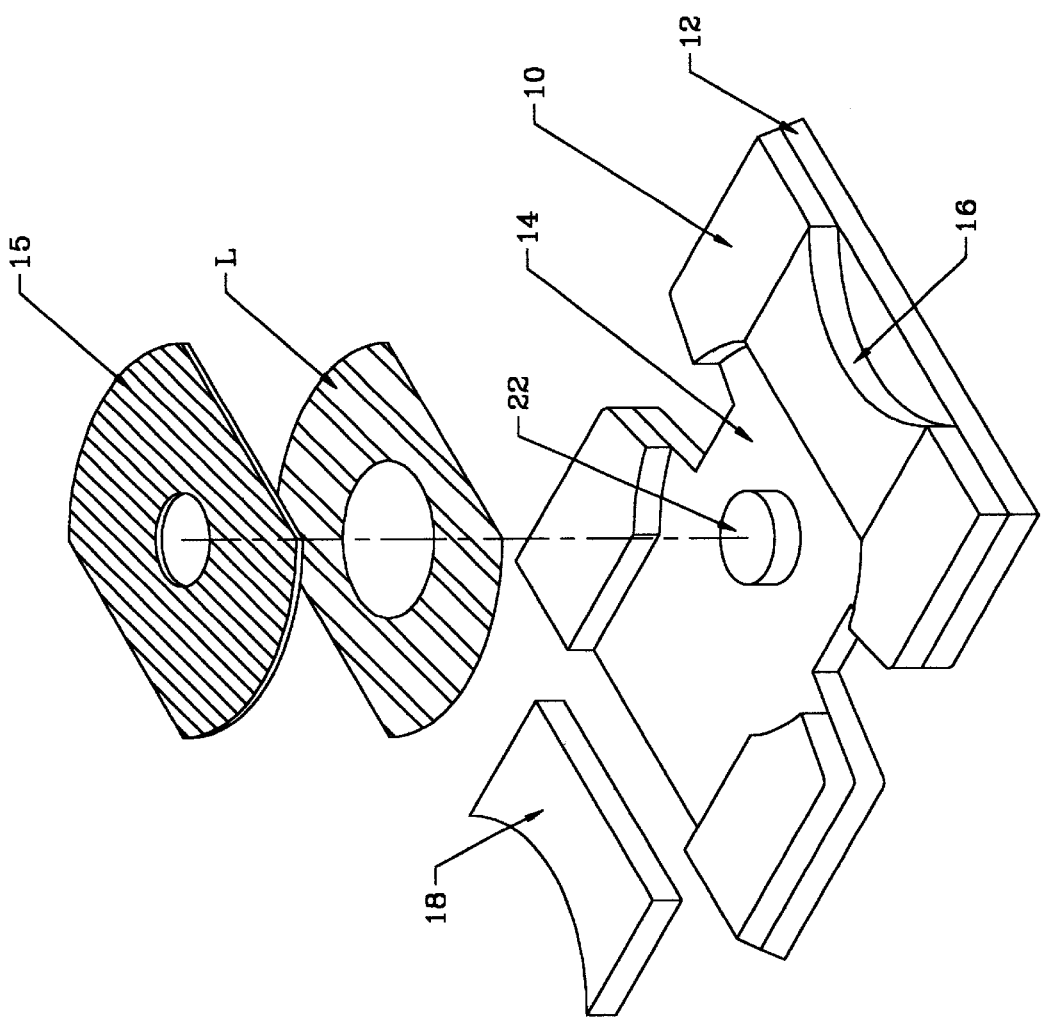
FIG. 5 is a view of the fixture of FIG. 4 with the composite disc and label removed from the fixture.
Figure 6:
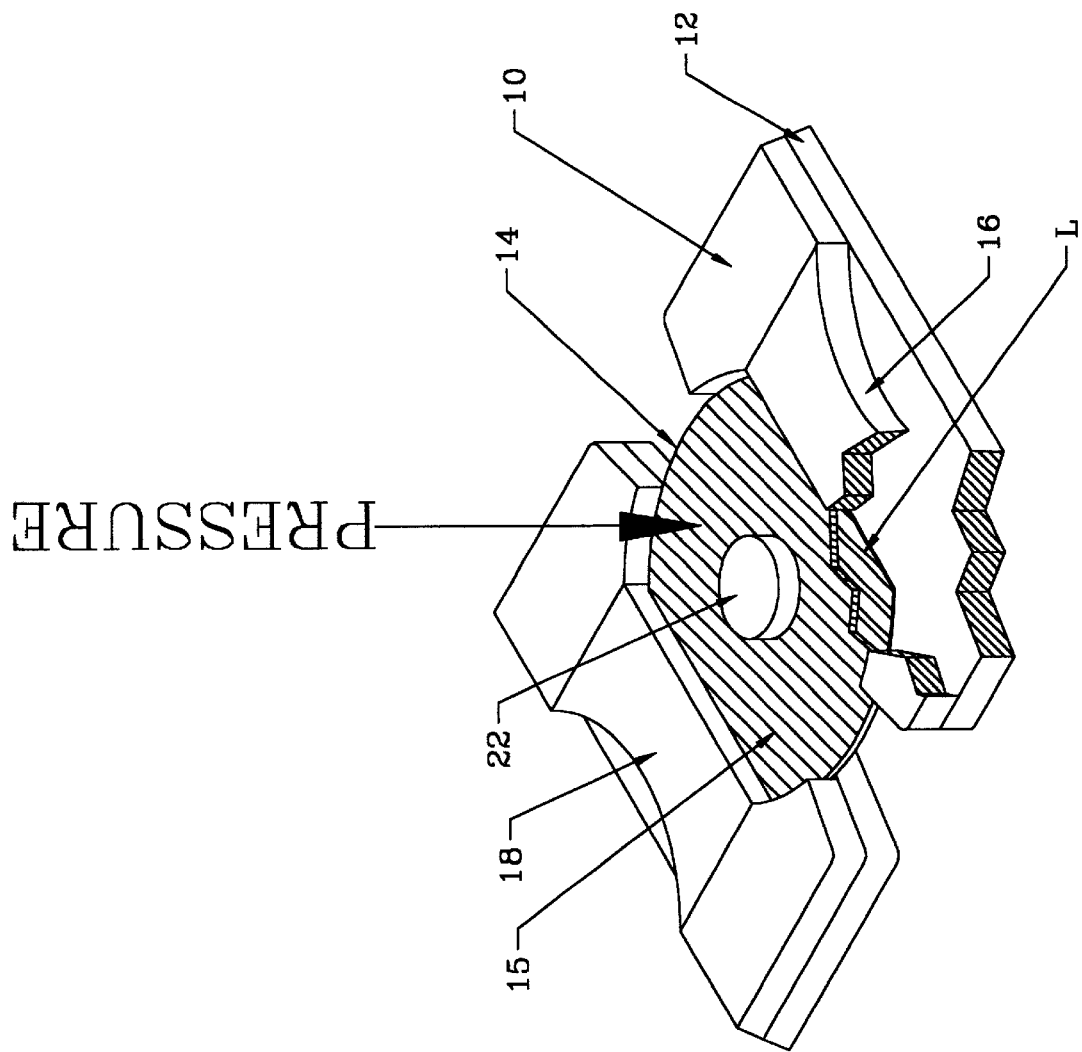
FIG. 6 is a perspective view of an alternative embodiment of the fixture of the present invention provided with a central guide post for the label or disc.

Referring now to the drawings in detail wherein like numerals indicate like elements throughout the several views, a fixture in accordance with the present invention is illustrated in FIG. 1 by the numeral 10.

The fixture 10 includes a body 12 formed from plastic or metal, provided with an oval-shaped well 14 sized to approximate the shape of an oval-shaped CD-ROM disc D imprinted with relevant business information normally found on a business card and more about the individual's company and a label L to be printed by a computer and adhered to the disc.

Located at opposite sides of the fixture are trapezoidal-shaped cutouts 16, 18. A centrally located round or circular aperture 20 can also be provided in well 14 opening through the bottom of the well and body 12.

Alternatively, in lieu of a central aperture 20, a centrally located upright cylindrical post 22 can be provided for use as described hereinafter.

In accordance with this invention, the side wall surrounding the well may be removed and rotated to accommodate a different-shaped CD-ROM disc which will fit precisely in the well. The side wall, includes an arcuate edge and a straight edge so that when positioned and adhered by an adhesive, (which permits alternate use for either shape), the edges form a continuation of the well in a shape to accommodate and match the outer perimeter of the disc, and label to be adhered to the disc, which is pressed to the unwritten face of the disc. The disc can also be shipped or packaged in the well.

In use, a label L can be printed with indicia and placed in well 14 with its adhesive side up and slid into the well over post 22. The removable and rotatable side walls of the well have a paper backing peeled therefrom and positioned in the well with either their straight edge innermost or their arcuate edge innermost to accommodate the truncated CD-disc 13 or minidisk 15 respectively and similarly shaped label. A disc 13 or 15 containing relevant business information is adhered to label L by inserting the same in well 14 overlying label L. The composite or laminated disc can be removed form well 14 by lifting it out of the well by inserting fingers in cut-outs 16, 18 and raising the laminate.

The central post 22 provided in the fixture guides the disc in spaced relation to the label L before contact is made by sliding the disc downwardly over the post until it is proximate to the label and then, applying adhering pressure. This precludes premature contact between the disc and label enabling adhesion of the label on the full face of the disc. As described heretofore, the fixture 10 enables reversal of the placement of the disc and label during use. Further, the fixture 10 with disc 13 and 15 inserted therein can be used on a shipping or packing tray for the disc.

What is claimed is:

1. A fixture for adhering a label to a truncated CD-ROM disc compromising:

a body, a well in said body approximating the shape of a CD-ROM disc, and the label to be adhered to said disc, whereby said disc and label can be placed in said well in overlying relation to adhere one to another, and said well including:

a pair of rotatable side walls having a straight edge and an opposed arcuate edge which can be alternately positioned to face the interior of the well.

2. The fixture of claim 1 wherein at least one opening is formed in a sidewall of said body.

3. The fixture of claim 2 including a pair of oppositely disposed openings in said body.

4. The fixture of claim 3 wherein said openings are substantial trapezoidal in shape.

5. The fixture of claim 4 wherein said trapezoidal openings terminate in an arcuate surface.

6. The fixture of claim 1 wherein a bottom surface of said side walls includes an adhesive and peelable strip overlying said adhesive.

7. The fixture of claim 1 wherein a bottom surface of said side walls includes an adhesive.

* * * * *